United States Patent
Her et al.

(10) Patent No.: US 12,491,244 B2
(45) Date of Patent: Dec. 9, 2025

(54) PHARMACEUTICAL COMBINATIONS FOR TREATING TUMOR COMPRISING ANTI-CD19 ANTIBODY AND NATURAL KILLER CELL

(71) Applicants: GC CELL CORPORATION, Seoul (KR); INCYTE CORPORATION, Wilmington, DE (US)

(72) Inventors: Jung Hyun Her, Gyeonggi-do (KR); Mi Young Jung, Gyeonggi-do (KR); Su Hyun Gwon, Gyeonggi-do (KR); Ho Yong Lim, Gyeonggi-do (KR); Sung Yoo Cho, Gyeonggi-do (KR); Sung Yong Won, Gyeonggi-do (KR); Yu Kyeong Hwang, Gyeonggi-do (KR); Jan Endell, Planegg (DE); Rainer Boxhammer, Planegg (DE)

(73) Assignees: GC Cell Corporation, Seoul (KR); Incyte Corporation, Wilmington, DE (US)

( * ) Notice: Subject to any disclaimer, the term of this patent is extended or adjusted under 35 U.S.C. 154(b) by 1032 days.

(21) Appl. No.: 17/275,292

(22) PCT Filed: Sep. 5, 2019

(86) PCT No.: PCT/KR2019/011474
§ 371 (c)(1),
(2) Date: Mar. 11, 2021

(87) PCT Pub. No.: WO2020/055040
PCT Pub. Date: Mar. 19, 2020

(65) Prior Publication Data
US 2022/0047632 A1    Feb. 17, 2022

(30) Foreign Application Priority Data
Sep. 12, 2018    (KR) .................. 10-2018-0109093

(51) Int. Cl.
| | |
|---|---|
| *A61K 39/395* | (2006.01) |
| *A61K 40/15* | (2025.01) |
| *A61K 40/42* | (2025.01) |
| *A61P 35/00* | (2006.01) |
| *C07K 16/28* | (2006.01) |
| *C12N 5/0783* | (2010.01) |

(52) U.S. Cl.
CPC .......... *A61K 39/3955* (2013.01); *A61K 40/15* (2025.01); *A61K 40/42* (2025.01); *A61P 35/00* (2018.01); *C07K 16/2896* (2013.01); *C12N 5/0646* (2013.01); *A61K 2239/31* (2023.05); *A61K 2239/38* (2023.05); *A61K 2239/48* (2023.05)

(58) Field of Classification Search
CPC .................................................. A61K 35/17
See application file for complete search history.

(56) References Cited

U.S. PATENT DOCUMENTS

| | | |
|---|---|---|
| 2009/0142349 A1 | 6/2009 | Rao-Naik et al. |
| 2012/0082664 A1 | 4/2012 | Bernett et al. |
| 2012/0321646 A1 | 12/2012 | Kohrt et al. ............... 424/174.1 |
| 2017/0137516 A1 | 5/2017 | Foster et al. ....... C07K 16/2803 |
| 2017/0319621 A1 | 11/2017 | Min et al. |
| 2018/0153892 A1* | 6/2018 | Endell ..................... A61K 47/68 |
| 2021/0189343 A1* | 6/2021 | Kokaji ................. C12N 5/0636 |

FOREIGN PATENT DOCUMENTS

| | | |
|---|---|---|
| JP | 2018-501779 | 1/2018 |
| KR | 10-1644984 | 8/2016 |
| KR | 10-1697473 | 1/2017 |
| KR | 10-1799986 | 11/2017 |
| WO | WO 2005/012493 | 2/2005 |
| WO | WO 2007/002223 | 1/2007 |
| WO | WO 2007/076950 | 7/2007 |
| WO | WO 2008/022152 | 2/2008 |
| WO | WO 2008/031056 | 3/2008 |
| WO | WO 2009/052431 | 4/2009 |
| WO | WO 2010/053716 | 5/2010 |
| WO | WO 2010/095031 | 8/2010 |
| WO | WO 2013/024095 | 2/2013 |
| WO | WO 2013/024097 | 2/2013 |
| WO | WO 2015/195498 | 12/2015 |
| WO | WO 2016/189014 | 12/2016 |
| WO | WO 2017/032679 | 3/2017 |
| WO | WO 2017/207574 | 12/2017 |
| WO | WO 2018/002031 | 1/2018 |

(Continued)

OTHER PUBLICATIONS

Sanchez-Martinez et al., "Expansion of allogeneic NK cells with efficient antibody-dependent cell cytotoxicity against multiple tumors", Theranostics, Jun. 14, 2018, vol. 8, No. 14, pp. 3856-3869. (Year: 2018).*

Kellner et al. "The CD19 Antibody MOR208 Efficiently Triggers Natural Killer Cell-Mediated Cytotoxicity Against Acute Lymphoblastic Leukemia Cells From Pediatric and Adult Patients". Blood. vol. 120, Issue 21, 2012, p. 1502. (Year: 2012).*

European Search Report in European Application No. 19860501.6, dated May 3, 2022, 11 pages.

Jurczak et al., "Phase IIa study of the CD19 antibody MOR208 in patients with relapsed or refractory B-cell non-Hodgkin's lymphoma," Annals of Oncology, 2018, 29(5):1266-1272.

(Continued)

*Primary Examiner* — Christopher M Babic
*Assistant Examiner* — Hanan Isam Abuzeineh
(74) *Attorney, Agent, or Firm* — Fish & Richardson P.C.

(57) ABSTRACT

Provided is a pharmaceutical combination comprising an antibody specific for CD19 and a natural killer cell, and a treatment method using the same. Such a pharmaceutical combination is capable of exhibiting synergistic therapeutic effects on a malignant tumor of B-cell origin such as non-Hodgkin's lymphoma, chronic lymphocytic leukemia, and/or acute lymphoblastic leukemia.

23 Claims, 3 Drawing Sheets

Specification includes a Sequence Listing.

(56) References Cited

FOREIGN PATENT DOCUMENTS

| WO | WO 2018/078123 | 5/2018 |
|---|---|---|
| WO | WO 2018/220040 | 12/2018 |
| WO | WO 2020/055040 | 3/2020 |
| WO | WO 2020/225196 | 11/2020 |
| WO | WO 2021/084062 | 5/2021 |
| WO | WO 2021/084063 | 5/2021 |
| WO | WO 2021/084064 | 5/2021 |
| WO | WO 2021/259902 | 12/2021 |
| WO | WO 2022/117799 | 6/2022 |
| WO | WO 2023/118395 | 6/2023 |

OTHER PUBLICATIONS

Kellner et al., "The Fc-engineered CD19 antibody MOR208 (XmAb5574) induces natural killer cell-mediated lysis of acute lymphoblastic leukemia cells from pediatric and adult patients," Leukemia, 2013, 27(7):1595-1598.

Lim et al., "GMP-compliant, large-scale expanded allogeneic natural killer cells have potent cytolytic activity against cancer cells in vitro and in vivo, " PLOS One, 2013, 8(1):1-9.

Ochoa et al., "Antibody-dependent cell cytotoxicity: immunotherapy strategies enhancing effector NK cells," Immunology and Cell Biology, 2017, 95:347-355.

Sarkar et al., "Dynamic Analysis of Human Natural Killer Cell Response at Single-Cell Resolution in B-Cell Non-Hodgkin Lymphoma," Frontiers in Immunology, Dec. 14, 2017, 8(1736):1-13.

International Search Report and Written Opinion in PCT/KR2019/011474 dated Dec. 9, 2019.

International Preliminary Report on Patentability in PCT/KR2019/011474 dated Mar. 9, 2021.

Awan et al. "CD19 targeting of chronic lymphocytic leukemia with a novel Fc-domain-engineered monoclonal antibody" Blood 2010 115(6) : 1204-1213.

Nadler et al. "B4, a Human B Lymphocytic-Associated Antigen Expressed on Normal, Mitogen-Activated, Malignant B Lymphocytes" The Journal of Immunology 1983 131 (1) : 244-250.

Sanchez-Martinez et al. "Expansion of allogeneic NK cells with efficient antibody-dependent cell cytotoxicity against multiple tumors" Theranostics 2018 8 (14) : 3856-3869.

Yang et al., "Phase I Study of Random Healthy Donor-Derived Allogeneic Natural Killer Cell Therapy in Patients with Malignant Lymphoma or Advanced Solid Tumors," Cancer Immunology Research, Mar. 2016, 4(3):215-224.

Chan et al., "Antibody-Dependent Cell-Mediated Cytotoxicity Overcomes NK Cell Resistance in MLL-Rearranged Leukemia Expressing Inhibitory KIR Ligands but Not Activating Ligands," Clinical Cancer Research, Nov. 15, 2012, 18(22):6296-6305.

\* cited by examiner

[Fig. 1a]
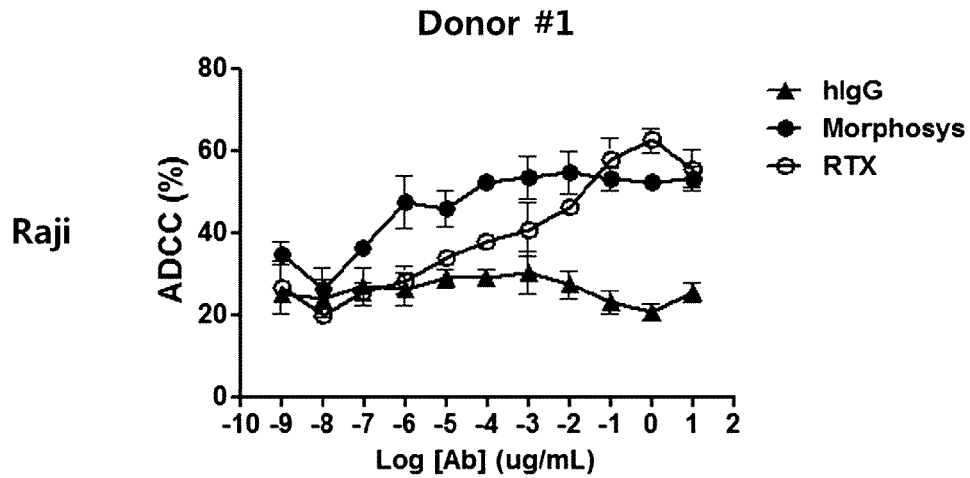
[Fig. 1b]
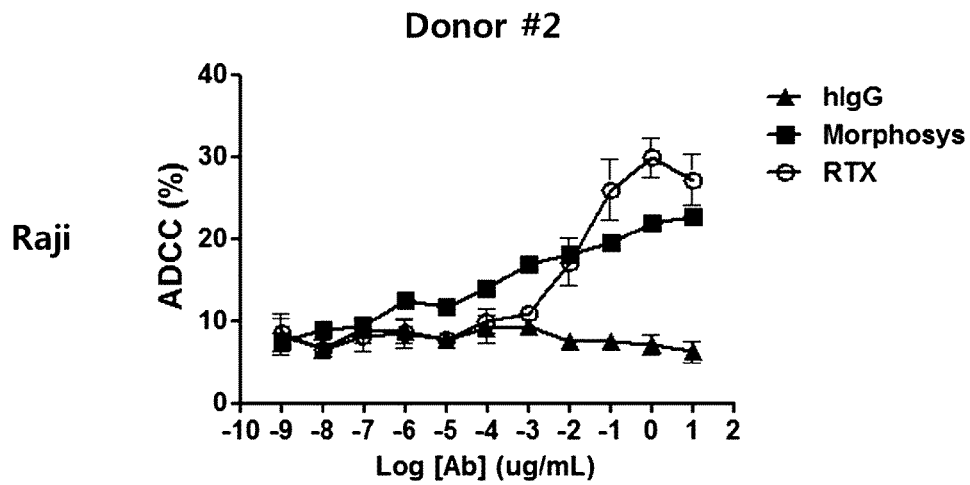
[Fig. 1c]
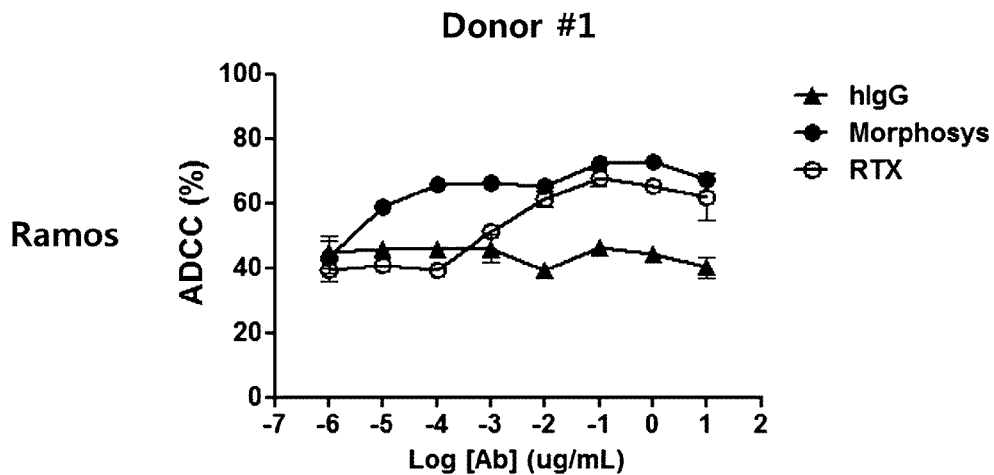

[Fig. 1d]
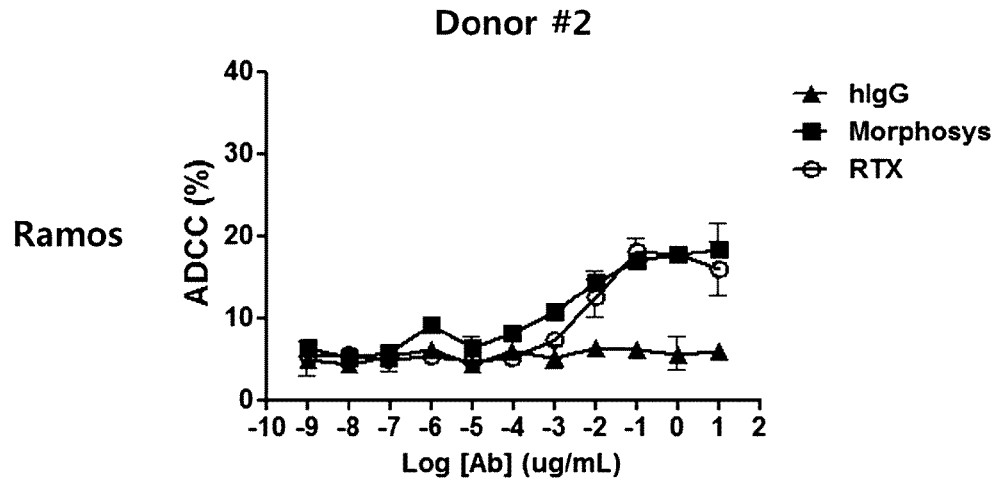
[Fig. 2]
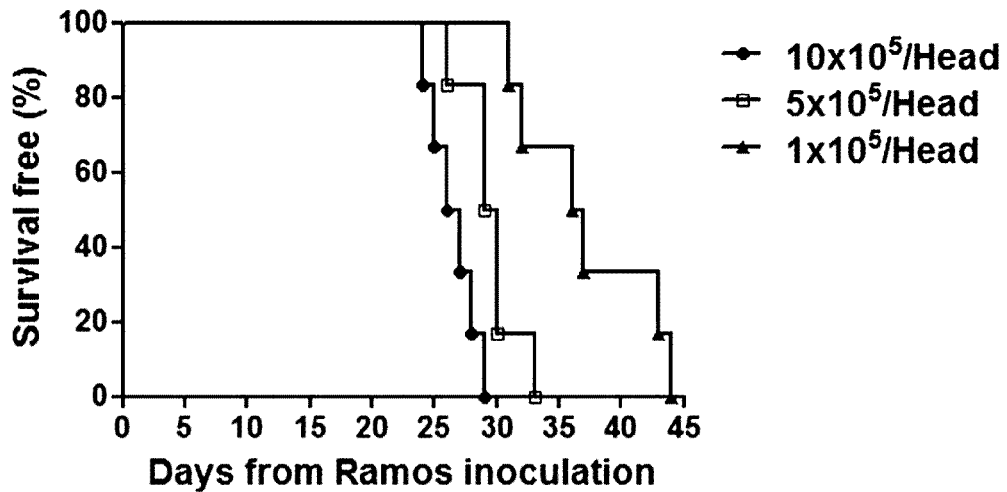
[Fig. 3]
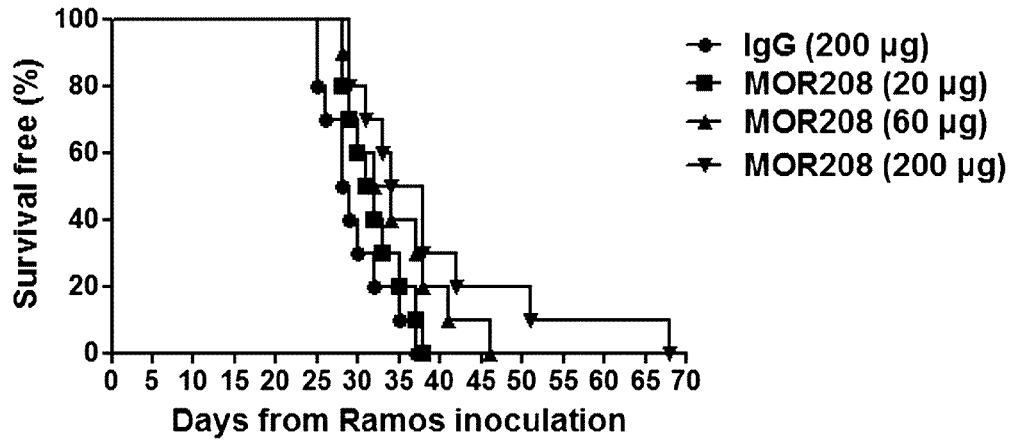

[Fig. 4]
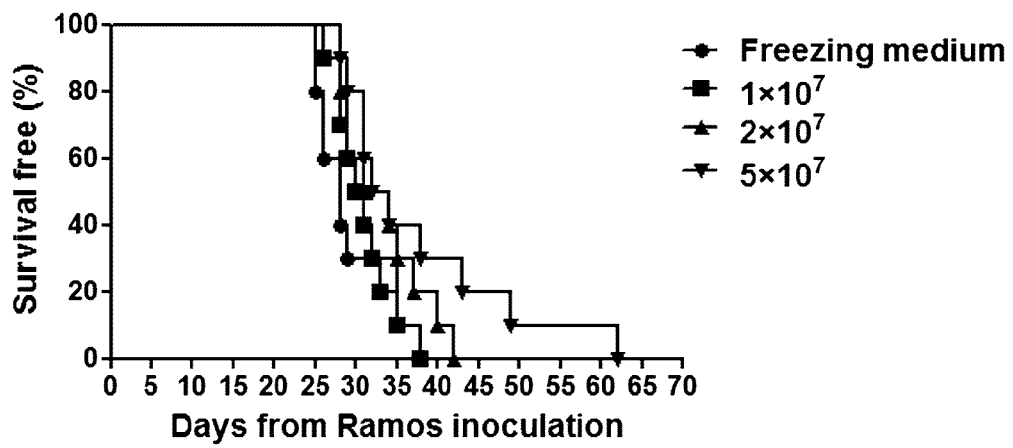
[Fig. 5]
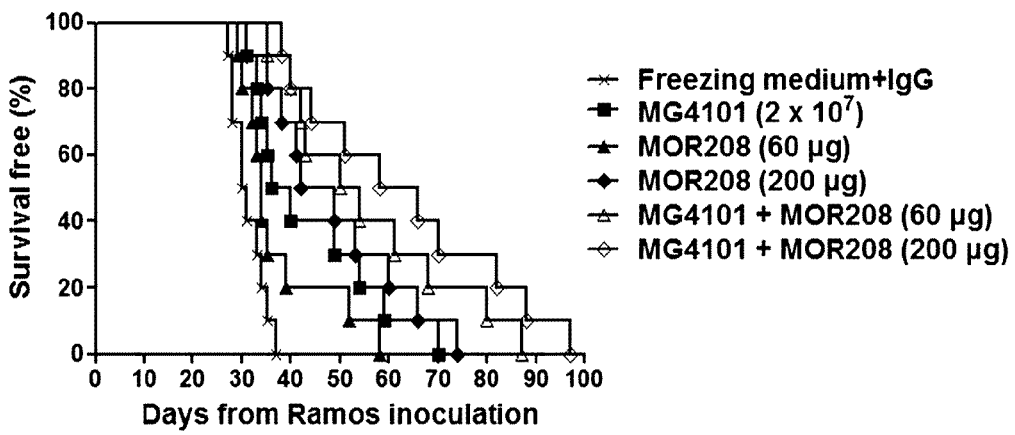

PHARMACEUTICAL COMBINATIONS FOR TREATING TUMOR COMPRISING ANTI-CD19 ANTIBODY AND NATURAL KILLER CELL

This patent application is the National Stage of International Application No. PCT/KR2019/011474 filed Sep. 5, 2019, which claims the benefit of priority from KR 10-2018-0109093 filed Sep. 12, 2018, each of which is incorporated herein by reference in its entirety.

TECHNICAL FIELD

An embodiment of the present invention is directed to a pharmaceutical combination comprising an anti-CD19 antibody and a natural killer cell, which has synergistic therapeutic effects on a malignant tumor of B cell origin such as non-Hodgkin's lymphoma, chronic lymphocytic leukemia (CLL), and/or acute lymphoblastic leukemia (ALL).

BACKGROUND ART

Natural killer cells (NK cells) are known to be lymphoid cells that recognize a target in a non-MHC-restricted manner unlike T cells and play an important role in innate immune responses. The natural killer cells can exert anti-viral and anti-cancer efficacies. Specifically, the natural killer cells play a role of directly killing a malignant tumor, or of inducing dendritic cell activities or tumor-specific cytotoxic T lymphocytes (CTLs) to eliminate abnormal cells that have developed tumors or are developing tumors. In addition, regarding the anti-cancer efficacies of the natural killer cells, it has been proven that use of allogeneic natural killer cells having mismatch with killer cell immunoglobulin-like receptor (KIR)-ligand pairs in the treatment of cancer patients is much more efficacious and safer than use of autologous natural killer cells.

On the other hand, human CD19 molecules are cell surface receptors expressed on surfaces of human B cells, for example, pre-B cells, immature B cells at an early stage of development, mature B cells, and malignant B cells. In fact, most of B-cell lineage malignant tumors express CD19, including non-Hodgkin's lymphoma, chronic lymphocytic leukemia (CLL), and acute lymphoblastic leukemia (ALL). Therefore, anti-CD19 antibodies can bind to CD19 antigens as targets, and thus can be used in a therapeutic immunotherapy of the above-mentioned malignant tumors of B cell origin.

Despite recent discoveries and developments of several anti-cancer agents, due to poor prognosis for many types of cancers including CD19-expressing tumors, there is still a need for an improved method or therapeutic agent for treating such types of cancers. Accordingly, the present inventors have confirmed that combined administration of a natural killer cell and an antibody specific for CD19 has synergistic effects on the treatment of malignant lymphomas of B cell origin, and have completed the present invention.

[Citation List] Non-Patent Literature: Nadler et al., J. Immunol., 131: 244-250 (1983)

DISCLOSURE OF INVENTION

Technical Problem

An object of the present invention is to provide a combined therapy using an antibody specific for CD19 and a natural killer cell, or a combination thereof.

Solution to Problem

In order to achieve the above object, an embodiment of the present invention can provide a pharmaceutical combination for the treatment of cancer, comprising an antibody specific for CD19 and a natural killer cell (NK cell).

The antibody may have a heavy chain variable region comprising an HCDR1 region of SYVMH (SEQ ID NO: 1), an HCDR2 region of NPYNDG (SEQ ID NO: 2), and an HCDR3 region of GTYYYGTRVFDY (SEQ ID NO: 3).

The antibody may have a light chain variable region comprising an LCDR1 region of RSSKSLQNVNGNTYLY (SEQ ID NO: 4), an LCDR2 region of RMSNLNS (SEQ ID NO: 5), and an LCDR3 region of MQHLEYPIT (SEQ ID NO: 6).

The antibody may have a heavy chain variable region comprising an HCDR1 region of SYVMH (SEQ ID NO: 1), an HCDR2 region of NPYNDG (SEQ ID NO: 2), and an HCDR3 region of GTYYYGTRVFDY (SEQ ID NO: 3), and a light chain variable region comprising an LCDR1 region of RSSKSLQNVNGNTYLY (SEQ ID NO: 4), an LCDR2 region of RMSNLNS (SEQ ID NO: 5), and an LCDR3 region of MQHLEYPIT (SEQ ID NO: 6).

The antibody may comprise a heavy chain variable region of EVQLVESGGGLVKPGGSLKLSCAASGYTFTSYVMHWVRQAPGKGLEWIGYIN PYNDGTKYNEKFQGRVTISSDKSISTAYMELSSLRSEDTAMYYCARGTYYYGT RVFDYWGQGTLVTVSS (SEQ ID NO: 8) and a light chain variable region of DIVMTQSPATLSLSPGERATLSCRSSKSLQNVNGNTYLYWFQQKPGQSPQLLIYR MSNLNSGVPDRFSGSGSGTEFTLTISSLEPEDFAVYYCMQHLEYPITFGAGTKL EIK (SEQ ID NO: 9).

The antibody may comprise a heavy chain constant region of ASTKGPSVFPLAPSSKSTSGGTAALGCLVKDYFPEPVTVSWNSGALTSGVHTFPAVLQSSGL YSLSSVVTVPSSSLGTQTYICNVNHKPSNTKVDKKVEPKSCDKTHTCPPCPAPE LLGGPDVFLFPPKPKDTLMISRTPEVTCVVVDVSHEDPEVQFNWYVDGVEVH NAKTKPREEQFNSTFRVVSVLTVVHQDWLNGKEYKCKVSNKALPAPEEKTIS KTKGQPREPQVYTLPPSREEMTKNQVSLTCLVKGFYPSDIAVEWESNGQPENN YKTTPPMLDSDGSFFLYSKLTVDKSRWQQGNVFSCSVMHEALHNHYTQKSLS LSPGK (SEQ ID NO: 10).

The antibody may comprise a light chain constant region of RTVAAPSVFIFPPSDEQLKSGTASVVCLLNNFYPREAKVQWKVDNALQSGNSQESVTEQDSKDSTYSL SSTLTLSKADYEKHKVYACEVTHQGLSSPVTKSFNRGEC (SEQ ID NO: 11).

The NK cell may be prepared by a method comprising step (i) of performing a stationary culture of NK cells in a culture solution containing anti-CD3 antibodies, cytokines, and feeder cells, to stimulate intercellular contacts, step (ii) of adding cytokines, anti-CD3 antibodies, and feeder cells thereto for re-stimulation and performing a stationary culture again to induce intracellular contacts, and step (iii) of adding a medium containing cytokines to the cells and performing a stationary or suspension culture while constantly maintaining a concentration of the cells and a concentration of the cytokines.

The NK cell may be prepared by a method comprising a step of co-culturing CD4(+) T cells that have been isolated ex vivo or CD4(+) T cells that have been expansion-cultured ex vivo, as feeder cells, and seed cells.

The CD4(+) T cells may be CD4(+)/CD1(−) T cell lines.

The CD4(+)/CD1(−) T cell lines may be H9 or HuT78 cell lines.

The seed cells may be one or more selected from the group consisting of peripheral blood-derived cells, peripheral blood leukocyte cells, peripheral blood mononuclear cells (PBMCs), umbilical cord blood leukocyte cells, umbilical cord blood mononuclear cells, natural killer cells derived from stem cells, enriched natural killer cells, and isolated natural killer cells.

Further, the pharmaceutical combination may further comprise albumin.

The cancer may be at least one selected from the group consisting of gastric cancer, liver cancer, lung cancer, colorectal cancer, breast cancer, prostate cancer, ovarian cancer, pancreatic cancer, cervical cancer, thyroid cancer, laryngeal cancer, acute lymphoblastic leukemia, brain tumor, neuroblastoma, retinoblastoma, head and neck cancer, salivary gland cancer, and lymphoma.

The lymphoma may be a malignant tumor of B cell origin.

The malignant tumor of B cell origin may be at least one selected from the group consisting of non-Hodgkin's lymphoma, chronic lymphocytic leukemia, and acute lymphoblastic leukemia.

The antibody specific for CD19 and the NK cell may be administered in a separate manner.

The antibody specific for CD19 and the NK cell may be administered in a simultaneous manner.

Another embodiment of the present invention can provide a kit for the treatment of cancer, comprising the above-described combination.

Still another embodiment of the present invention can provide a use of the above-described pharmaceutical combination for preparing a medicament for the treatment of cancer.

Further, yet another embodiment of the present invention can provide a method for the treatment of cancer, comprising a step of administering, to a subject, the above-mentioned antibody specific for CD19 and the above-mentioned NK cell in combination.

Advantageous Effects of Invention

The pharmaceutical combination comprising an antibody specific for CD19 and a natural killer cell, according to the embodiment of the present invention, is useful for the treatment of cancer, in particular, a B-cell malignant tumor such as non-Hodgkin's lymphoma, chronic lymphocytic leukemia, and/or acute lymphocytic leukemia. In particular, the natural killer cell is produced in a clinically friendly manner as compared with conventional methods so as to have high cell-killing efficacy, cell survival rate, and long-term storability, and is capable of exhibiting synergistic effects on the treatment of tumor in a case of being administered in combination with a certain antibody specific for CD19.

BRIEF DESCRIPTION OF DRAWINGS

FIGS. 1a to 1d show results obtained by culturing Burkitt's B-cell lymphomas, Raji and Ramos, with various concentrations of monoclonal antibodies in the presence of NK cells.

FIG. 2 shows results obtained by evaluating suitability of Ramos cell lines in an SCID mice model.

FIG. 3 shows results obtained by administering MOR208 at different concentrations in an SCID mice model group into which Ramos cells had been intravenously injected.

FIG. 4 shows results obtained by administering MG4101 at different concentrations in an SCID mice model group into which Ramos cells had been intravenously injected.

FIG. 5 shows results obtained by administering a control, MOR208, MG4101, and "MOR208/MG4101" in an SCID mice model group into which Ramos cells had been intravenously injected.

BEST MODE FOR CARRYING OUT THE INVENTION

Despite a possibility that natural killer cells can be applied as therapeutic agents for various diseases, it has not been easily accessed due to several limitations such as a rather restricted number of natural killer cells in peripheral blood, difficulties associated with good manufacturing practice (GMP)-compliant large-scale production for cytolytic natural killer cells, and natural killer cells having to be activated to induce natural killer cell-mediated killing.

Recently, the present inventors have established a simple and efficient method for large-scale proliferation and activation of natural killer cells derived from healthy donors under GMP conditions (KR10-1644984 B1). In addition, natural killer cells, which have been proliferated ex vivo through a method for large-scale culture of NK cells from umbilical cord blood mononuclear cells and highly activated, were produced under GMP conditions, and exhibited strong anti-cancer activities in vitro and in vivo in preclinical studies.

On the other hand, treatment methods using a monoclonal antibody specific to an epitope molecule expressed in cancer cells have been known as the most successful cancer immunotherapies to date. One of action mechanisms thereof is natural killer cell-mediated antibody-dependent cellular cytotoxicity (ADCC). Since the natural killer cell proliferated according to an embodiment of the present invention expressed high levels of CD16 which is an Fc receptor that mediates ADCC, the present inventors have made an attempt to check that anti-cancer activities thereof against B cell lymphoma can be enhanced in the presence of an anti-CD19 antibody.

Surprisingly, the present inventors have found that, in a case of administering a certain antibody specific for CD19 and a natural killer cell in combination, synergistic effects are exhibited in vitro and in vivo on direct death of a human B cell malignant tumor through ADCC, as compared with a case of administering the antibody or natural killer cell alone.

One aspect of the present invention provides a pharmaceutical combination for the treatment of cancer, comprising an antibody specific for CD19 and a natural killer cell.

As used herein, the term "CD19" refers to a protein known as CD19 having the following synonyms: B4, B-lymphocyte antigen CD19, B-lymphocyte surface antigen B4, CVID3, differentiation antigen CD19, MGC12802, and T-cell surface antigen Leu-12. The CD19 may be a human-derived CD19, and the human CD19 may comprise an amino acid sequence of SEQ ID NO: 7. The CD19 is expressed by cells and tissues with various diseases and pathologies, including most of B cell malignant tumors, and on normal B cells.

Further, as used herein, the term "antibody" refers to a monoclonal antibody including any isotype such as IgG, IgM, IgA, IgD, and IgE. The IgG antibody consists of two identical heavy chains and two identical light chains, linked by disulfide bonds. Each of the heavy chains and light chains comprises a constant region and a variable region. Each variable region comprises three segments called "complementarity-determining regions (CDRs)" or "hypervariable regions" that are primarily responsible for binding to an epitope of an antigen. These are sequentially numbered from an N-terminus and are referred to as CDR1, CDR2, and CDR3. A more highly conserved portion outside the CDRs in the variable region is called a "framework region."

That is, an anti-CD19 antibody is an antibody that specifically binds to a CD19 antigen, and may comprise not only a complete antibody form but also an antigen-binding fragment thereof.

Examples of the antibody specific for CD19 according to an embodiment of the present invention may include those described in U.S. Ser. No. 12/377,251 (Xencor); WO 2005/012493, WO 2010/053716 (lmmunomedics); WO 2007/002223 (Medarex); WO 2008/022152 (Xencor); WO 2008/031056 (Medimmune); WO 2007/076950 (Merck Patent GmbH); WO 2009/052431 (Seattle Genetics); and WO 2010/095031 (Glenmark Pharmaceuticals).

Further, the antibody specific for CD19 according to the embodiment of the present invention may comprise the heavy chain variable region comprising an HCDR1 region of SYVMH (SEQ ID NO: 1), an HCDR2 region of NPYNDG (SEQ ID NO: 2), and an HCDR3 region of GTYYYGTRVFDY (SEQ ID NO: 3). Besides, the antibody specific for CD19 of the present invention may comprise the light chain variable region comprising an LCDR1 region of RSSKSLQNVNGNTYLY (SEQ ID NO: 4), an LCDR2 region of RMSNLNS (SEQ ID NO: 5), and an LCDR3 region of MQHLEYPIT (SEQ ID NO: 6).

An antibody specific for CD19 according to another embodiment of the present invention may include an antibody that cross-competes with the antibody of the present invention as described above.

As used herein, the term "cross-compete" means an ability of an antibody or other binding agent to interfere with binding of another antibody or binding agent to CD19 in a standard competitive binding assay. The ability or extent to which the antibody or other binding agent is capable of interfering with the binding of another antibody or binding agent to CD19, and thus whether it can be referred to as cross-competition according to the invention, can be determined using the standard competitive binding assay.

Besides, the antibody specific for CD19 according to another embodiment of the present invention may include an antibody binding to the same epitope as the antibody of the present invention as described above.

Further, the antibody may comprise a heavy chain variable region of EVQLVESGGGLVKPGGSLKLSCAASGYTFTSYVMHWVRQAPGKGLEWIGYINPYNDGTKYNEKFQGRVTISSDKSISTAYMELSSLRSEDTAMYYCARGTYYYGTRVFDYWGQGTLVTVSS (SEQ ID NO: 8) and a light chain variable region of DIVMTQSPATLSLSPGERATLSCRSSKSLQNVNGNTYLYWFQQKPGQSPQLLIYRMSNLNSGVPDRFSGSGSGTEFTLTISSLEPEDFAVYYCMQHLEYPITFGAGTKL EIK (SEQ ID NO: 9). In addition, the antibody may comprise a heavy chain constant region of ASTKGPSVFPLAPSSKSTSGGTAALGCLVKDYFPEPVTVSWNSGALTSGVHTFPAVLQSSGLYSLSSVVTVPSSSLGTQTYICNVNHKPSNTKVDKKVEPKSCDKTHTCPPCPAPELLGGPDVFLFPPKPKDTLMISRTPEVTCVVVDVSHEDPEVQFNWYVDGVEVHNAKTKPREEQFNSTFRVVSVLTVVHQDWLNGKEY KCKVSNKALPAPEEKTISKTKGQPREPQVYTLPPSREEMTKNQVSLTCLVKGFYPSDIAVEWESNGQPENNYKTTPPMLDSDGSFFLYSKLTVDKSRWQQGNVFS CSVMHEALHNHYTQKSLSLSPGK (SEQ ID NO: 10). In addition, the antibody may comprise a light chain constant region of RTVAAPSVFIFPPSDEQLKSGTASVVCLLNNFYPREAKVQWKVDNALQSGNSQESVTEQDSKDSTYSLSSTLTL SKADYEKHKVYACEVTHQGLSSPVTKSFNRGEC (SEQ ID NO: 11). The above described anti-CD19 antibody may be "MOR208". The MOR208 antibody may be one disclosed in U.S. patent application Ser. No. 12/377,251.

As used herein, the term "natural killer cell (hereinafter referred to as NK cell) refers to a cytotoxic lymphocyte that plays an important role in the body's immune system. For purposes of the present invention, the NK cell may be an endogenous NK cell of a subject and/or an exogenous NK cell, specifically an isolated NK cell which is administered externally of the subject, but is not limited thereto. In addition, the NK cell can be obtained by purchase of a commercially available product, or according to conventional methods such as isolation from a subject or culture.

On the other hand, the NK cell contained in the pharmaceutical combination according to the embodiment of the present invention can be one prepared by stimulating mononuclear cells, from which T cells have been removed, with anti-CD3 antibodies and feeder cells in a medium containing cytokines, performing a stationary culture for several days to stimulate intracellular contacts, and performing a stationary or suspension culture of NK cells while constantly maintaining a concentration of the cells and a concentration of the cytokines.

In order to obtain an increased amount of NK cells, stimulation and stationary culture may be repeated before the subsequent stationary or suspension culture. The NK cell prepared by the method according to the present invention can be cultured ex vivo with high efficiency and high concentration while exhibiting high cell survival rate and cell-killing efficacy, and thus can be administered in combination with the anti-CD19 antibody to treat a malignant tumor of B cell origin.

As an example, the NK cell may be one prepared by a method comprising the following steps (i) to (iii).

Step (i) of performing a stationary culture of isolated NK cells in a culture solution containing anti-CD3 antibodies, cytokines, and feeder cells, to stimulate intercellular contacts;

step (ii) of adding cytokines, anti-CD3 antibodies, and feeder cells thereto for restimulation and performing a stationary culture again to induce intracellular contacts; and step (iii) of adding a medium containing cytokines to the cells and performing a stationary or suspension culture while constantly maintaining a concentration of the cells and a concentration of the cytokines.

Here, the isolated NK cells may be obtained by isolating leukocyte cells and NK cells from human peripheral blood or umbilical cord blood.

Here, the stationary culture after the initial stimulation may be performed for about 2 to 15 days, specifically for 5 to 10 days, and the stationary culture after the restimulation may be performed for about 2 to 7 days, specifically for 3 to 5 days. In addition, after completion of the stationary cultures, a stationary or suspension culture may be performed in an incubator while constantly maintaining a concentration of the cytokines. In addition, in a case of preparing the NK cell, as albumin is added to a composition containing an NK cell, cell-killing efficacy and cell survival rate of the NK cell can be greatly raised. Specifically, the NK cell prepared by the above-described method can be denoted as "MG4101". The method for preparing the NK cell according to an embodiment of the present invention and the NK cell may be those described in Korean Patent No. 10-1644984.

As used herein, the term "feeder cell (also referred to as culture-assisting cell)" refers to a cell that does not have an ability to proliferate by division but has a metabolic activity, thereby producing various metabolites to help proliferation of a target NK cell. As the feeder cells that can be used, animal cell lines into which genes have been introduced, peripheral blood leukocytes (PBLs) treated with various cytokines or compounds, self or non-self peripheral blood leukocytes (PBLs), T-cells, B-cells, or monocytes, or the like may be used, and, specifically, self peripheral blood mononuclear cells may be used, but not limited thereto.

Further, the self peripheral blood mononuclear cells used as the feeder cells can be inactivated to ensure safety. As an inactivation method, a conventional method known in the art can be used, and, for example, a gamma-ray irradiation method can be used. Such inactivated feeder cells include isolated T-cells. A proliferation method using the feeder cells as described above is a method of proliferating NK cells after pure isolation thereof, and has an advantage that only pure NK cells are continuously proliferated afterward.

As used herein, the term "anti-CD3 antibody" refers to an antibody that specifically binds to a CD3 antigen, which is a molecule group that binds to a T cell receptor (TCR) to form an antigen-recognition complex. A CD3 molecule binds to TCR and serves to transmit an antigen-recognition signal into a cell. The anti-CD3 antibody usable in the present invention is not limited as long as it is an antibody having properties of binding to CD3. For example, the anti-CD3 antibody can be selected from the group consisting of OKT3, UCHT1, and HIT3a, but is not limited thereto.

In the present invention, the cytokines that can be contained in a medium may be one or more selected from interleukins. For example, one or more selected from the group consisting of interleukin-2 (IL-2), interleukin-12 (IL-12), interleukin-15 (IL-15), interleukin-18 (IL-18), and interleukin-21 (IL-21) can be used, but not limited thereto.

Further, a concentration of the anti-CD3 antibodies in a medium, which is used for stationary culture and suspension culture, may be 0.1 to 1,000 ng/ml, 1 to 100 ng/ml, or 5 to 20 ng/ml, and a concentration of the cytokines in a medium may be 10 to 2,000 IU, 100 to 1,000 IU, or about 200 to 700 IU.

As used herein, the term "stimulation" means inducing proliferation of NK cells by adding the feeder cells or the like thereto, in which anti-CD3 antibodies may be used together. In addition, as used herein, the term "re-stimulation" means re-inducing proliferation of the NK cells by adding the feeder cells and/or the anti-CD3 antibodies again to a medium after a certain time of culture has elapsed.

As a medium for the preparation of the NK cell according to the embodiment of the present invention, a common medium for animal cell cultures such as CellGro medium (Cellgenix), AIM-V medium, RPMI 1640 medium, and X-VIVO 20 can be used.

In particular, in the preparation method of the NK cell, in order to constantly maintain a concentration of the cells and the cytokines during suspension culture, concentrations of the cytokines and cells in a medium can be measured at certain time intervals, and, depending on the measured values, a cytokine-containing medium may be provided to comply with the concentration of the cells and the cytokines.

Further, culture may be performed by adding, to the medium, serum or plasma, and an additional proliferation factor that supports proliferation of lymphocytes. Types of serum or plasma to be added to the medium are not particularly limited. Any commercially available animal-derived one can be used, and human-derived one which is derived from the same person can be used. For example, it is possible to add a combination of cytokines that proliferate lymphocytes from peripheral blood mononuclear cells, lectins that stimulate proliferation of lymphocytes, or the like.

In particular, as albumin is added to a composition containing the NK cell prepared by the method of the present invention, in terms of long-term storability of the NK cell, cell-killing efficacy and cell survival rate thereof can be greatly raised. An amount of albumin to be added is not particularly limited. Albumin may be contained, specifically, in a range of 0.1% to 5% by weight, and, more specifically, in a range of 0.5% to 2% by weight, within the entire composition.

Further, by applying a culture method that constantly maintains a concentration of cells for the preparation of NK cells, it is possible to prevent overgrowth of the cells, thereby maintaining the cells in an optimal state. In particular, even in a case of being thawed after freezing, the cells do not have impaired function, and can maintain high cell survival rate and cell-killing efficacy. Therefore, there is an advantage that storage and supply are easily done in a liquid or frozen storage form without additional processing.

On the other hand, the NK cell used in the present invention may be, as an example, one prepared by a method comprising a step of co-culturing CD4(+) T cells that have been isolated ex vivo or CD4(+) T cells that have been expansion-cultured ex vivo, as feeder cells, and seed cells.

Specifically, the CD4(+) T cells used in the present invention may be CD4(+)/CD1(−) T cell lines, and, more specifically, may be H9 or HuT78 cell lines.

As used herein, the term "seed cell" means a cell as a starting material for obtaining a target cell. The seed cells used in the present invention may be, but not limited to, one or more selected from the group consisting of peripheral blood-derived cells, peripheral blood leukocyte cells, peripheral blood mononuclear cells (PBMC), umbilical cord blood leukocyte cells, umbilical cord blood leukocyte cells, umbilical cord blood mononuclear cells, natural killer cells derived from stem cells, enriched natural killer cells, and isolated natural killer cells.

With respect to the preparation method of the NK cell according to the embodiment of the present invention and the NK cell, those may be the ones described in Korean Patent Nos. 10-1697473 or 10-1799986.

Such a preparation method of the NK cell is capable of not only selectively proliferating only NK cells at a large scale from a small amount of seed cells, but also allowing maintenance of high killing efficacy thereof. Therefore, due to containing the NK cell produced by such a method thus has high cell survival rate and cell-killing efficacy, and a certain anti-CD19 antibody, the pharmaceutical combination according to an embodiment of the present invention exhibits quite excellent cancer therapeutic effects.

Further, as used herein, the term "combination" means a composition in which more than one effective ingredient, for example, effective ingredients such as an antibody and a natural killer cell, are combined. The respective effective ingredients contained in the combination of the present invention may be administered, to a subject, in a simultaneous manner, or in a separate manner at different times. Thus, the respective effective ingredients need not necessarily be present in the combination as a form of a single composition at the time of administration. The combination according to the present invention is related to a combination, a medicament, and a pharmaceutical composition. In embodiments, the components of the combination are administered at a time where both components (drugs) are active in the patient at the same time. It is implied by "synergism" that both drugs are active in the patient at the same time. In embodiments, the components of the combination are administered together, simultaneously, separately or subsequently, either physically or in time. In embodiments, the components of the combination are administered simultaneously.

The pharmaceutical combination is applicable to all types of tumors, including solid cancers and blood cancers. Unlike the blood cancers, the solid cancers refer to cancers formed in a lump in organs. Cancers developed in most of organs correspond to the solid cancers. There is no particular limitation on tumors that can be treated using the pharmaceutical combination according to the present invention. The pharmaceutical combination according to the present invention can have synergistic therapeutic effects, for example, on at least one disease selected from the group consisting of gastric cancer, liver cancer, lung cancer, colorectal cancer, breast cancer, prostate cancer, ovarian cancer, pancreatic cancer, cervical cancer, thyroid cancer, laryngeal cancer, acute myeloid leukemia, brain tumor, neuroblastoma, retinoblastoma, head and neck cancer, salivary gland cancer, and lymphoma.

As used herein, the terms "synergy", "synergistic effect", and "synergistic action" mean going beyond an additive effect of a combination which is expected due to combination.

Further, the lymphoma may be, specifically, a malignant tumor of B cell origin, which may be at least one selected from the group consisting of non-Hodgkin's lymphoma, chronic lymphocytic leukemia, and acute lymphoblastic leukemia.

The non-Hodgkin's lymphoma may be a lymphoma selected from the group consisting of follicular lymphoma, small lymphocytic lymphoma, mucosa-associated lymphoid tissue, marginal zone, diffuse large B cells, Burkitt, and mantle cells.

Two components of synergistic combination of the present invention, for example, an antibody specific for CD19 and an NK cell, may be administered in a concerted, simultaneous, separate, or sequential manner, from a physical or temporal point of view. As used herein, the term "administered" or "administering" is intended to encompass, but not limited to, deliveries by an injectable form such as by an intravenous, intramuscular, intradermal, or subcutaneous route, or by a mucosal route, for example, as a nasal spray or aerosol for inhalation, or as an ingestible solution, capsule, or tablet. In addition, the pharmaceutical combination may be administered in combination with another drug or physiologically active substance of which therapeutic effects are known for a disease to be treated, or may be formulated in the form of a combined preparation with another drug.

For example, the NK cell may be administered before and/or separately with administration of the antibody specific to CD19, an example of which is MOR208. In a case where the two components are administered together, these components may be formulated together in one pharmaceutical composition which may contain a pharmaceutically acceptable carrier or excipient. Alternatively, the two components may also be formulated in different pharmaceutical compositions. In this case, the two components may be administered in a simultaneous or separate manner. Specifically, in a case where the antibody specific for CD19 and the NK cell are administered, these components may be simultaneously active in the body of a patient having received the administration. For example, in a case where MOR208 is administered weekly and the NK cell is administered daily, active ingredients of both drugs are simultaneously present in the patient.

Further, another aspect of the present invention provides a kit for the treatment of cancer, comprising the above-described combination. Types of the kit are not particularly limited, and a kit having a type commonly used in the art can be used.

The kit may be packaged in a form in which the antibody specific for CD19 and the NK cell as described above are contained in individual containers, respectively, or in a form in which the antibody specific for CD19 and the NK cell as described above are contained in a single container which is divided into one or more compartments. Each of the antibody specific for CD19 and the NK cell may be packaged in a unit dose form with a single dose, but not limited thereto. The antibody specific for CD19 and the NK cell in the kit may be administered in combination, separately at appropriate times, depending on a health condition or the like of a subject to receive the administration.

Another aspect of the present invention provides a use of the above-described pharmaceutical combination for preparing a medicament for the treatment of cancer. In addition, there is provided a use of the above-described pharmaceutical combination for the treatment of cancerous diseases and similar pathologies.

Further, still another aspect of the present invention provides a method for the treatment of cancer, comprising step (a) of preparing an NK cell, step (b) of preparing an antibody specific for CD19, comprising the HCDR1 region of SYVMH (SEQ ID NO: 1), the HCDR2 region of NPYNDG (SEQ ID NO: 2), the HCDR3 region of GTYYYGTRVFDY (SEQ ID NO: 3), the LCDR1 region of RSSKSLQNVNGNTYLY (SEQ ID NO: 4), the LCDR2 region of RMSNLNS (SEQ ID NO: 5), and the LCDR3 region of MQHLEYPIT (SEQ ID NO: 6), and step (c) of administering, to a subject, therapeutically effective amounts of the antibody specific for CD19 and the NK cell in combination.

As used herein, the term "subject" means a mammal including a human, having a cancerous disease in a condition which can be alleviated, suppressed, or treated by administering the antibody specific for CD19 and the NK cell according to an embodiment of the present invention, or suffering from such a disease. Further, the subject may be a non-human animal, and the term "non-human animal" includes vertebrates such as mammals and non-mammals, for example, primates except humans, sheep, dogs, cats, horses, cows, chickens, amphibians, reptiles, etc.

It is possible to provide a method for the treatment of cancer, comprising step (a) of preparing an NK cell, step (b) of preparing an antibody specific for CD19, and step (c) of administering, to a subject, therapeutically effective amounts of the antibody specific for CD19 and the NK cell in combination.

Since the step (a) of preparing the NK cell, and the antibody specific to CD19 in the step (b) have already been described above, descriptions thereof are omitted in order to avoid excessive redundancy.

The step (c) of administering may be carried out by administering the antibody specific for CD19 and the NK cell in combination, in a simultaneous, sequential, or reverse-order manner.

An aspect of the present disclosure comprises a synergistic combination of an antibody specific for CD19 comprising an HCDR1 region of sequence SYVMH (SEQ ID NO: 1), an HCDR2 region of sequence NPYNDG (SEQ ID NO: 2), an HCDR3 region of sequence GTYYYGTRVFDY (SEQ ID NO: 3), a LCDR1 region of sequence RSSKSLQNVNGNTYLY (SEQ ID NO: 4), a LCDR2 region of sequence RMSNLNS (SEQ ID NO: 5), and a LCDR3 region of sequence MQHLEYPIT (SEQ ID NO: 6) and an NK cell for the treatment of non-Hodgkin's lymphoma, chronic lymphocytic leukemia and/or acute lymphoblastic leukemia. In embodiments, the non-Hodgkin's lymphoma is selected from the group consisting of follicular lymphoma, small lymphocytic lymphoma, mucosa-associated lymphoid tissue, marginal zone, diffuse large B cell, Burkitt's, and mantle cell. In an embodiment the NK cell is MG4101.

An aspect of the present disclosure comprises an antibody specific for CD19 comprising an HCDR1 region of sequence SYVMH (SEQ ID NO: 1), an HCDR2 region of sequence NPYNDG (SEQ ID NO: 2), an HCDR3 region of sequence GTYYYGTRVFDY (SEQ ID NO: 3), a LCDR1 region of sequence RSSKSLQNVNGNTYLY (SEQ ID NO: 4), a LCDR2 region of sequence RMSNLNS (SEQ ID NO: 5), and a LCDR3 region of sequence MQHLEYPIT (SEQ ID NO: 6) for the treatment of non-Hodgkin's lymphoma, chronic lymphocytic leukemia and/or acute lymphoblastic leukemia, wherein said antibody specific for CD19 is used in combination with an NK cell. In embodiments, the non-Hodgkin's lymphoma is selected from the group consisting of follicular lymphoma, small lymphocytic lymphoma, mucosa-associated lymphoid tissue, marginal zone, diffuse large B cell, Burkitt's, and mantle cell. In an embodiment, the NK cell is MG4101. In embodiments, the non-Hodgkin's lymphoma is follicular lymphoma. In embodiments, the non-Hodgkin's lymphoma is small lymphocytic lymphoma. In embodiments, the non-Hodgkin's lymphoma is mucosa-associated lymphoid tissue. In embodiments, the non-Hodgkin's lymphoma is marginal zone lymphoma. In embodiments, the non-Hodgkin's lymphoma is diffuse large B cell lymphoma. In embodiments, the non-Hodgkin's lymphoma is Burkitt's lymphoma. In embodiments, the non-Hodgkin's lymphoma is mantle cell lymphoma.

Another aspect comprises a method of treating non-Hodgkin's lymphoma, chronic lymphocytic leukemia and/or acute lymphoblastic leukemia in an individual in need thereof, which method comprises administration of an antibody specific for CD19 in combination with an NK cell. In embodiments of the method, the antibody specific for CD19 comprises an HCDR1 region of sequence SYVMH (SEQ ID NO: 1), an HCDR2 region of sequence NPYNDG (SEQ ID NO: 2), an HCDR3 region of sequence GTYYYGTRVFDY (SEQ ID NO: 3), an LCDR1 region of sequence RSSKSLQNVNGNTYLY (SEQ ID NO: 4), an LCDR2 region of sequence RMSNLNS (SEQ ID NO: 5), and an LCDR3 region of sequence MQHLEYPIT (SEQ ID NO: 6). In embodiments of the method, the antibody comprises the exemplified antibody specific for CD19. In embodiments of the method the NK cell is MG4101.

Another aspect includes a use of an antibody specific for CD19 wherein said antibody comprises an HCDR1 region of sequence SYVMH (SEQ ID NO: 1), an HCDR2 region of sequence NPYNDG (SEQ ID NO: 2), an HCDR3 region of sequence GTYYYGTRVFDY (SEQ ID NO: 3), an LCDR1 region of sequence RSSKSLQNVNGNTYLY (SEQ ID NO: 4), an LCDR2 region of sequence RMSNLNS (SEQ ID NO: 5), and an LCDR3 region of sequence MQHLEYPIT (SEQ ID NO: 6) in the manufacture of a medicament for the treatment of non-Hodgkin's lymphoma, chronic lymphocytic leukemia and/or acute lymphoblastic leukemia in synergistic combination with an NK cell. In an embodiment, the NK cell is MG4101.

Further, route of administration, dosage, and frequency of administration of the antibody specific for CD19 and the NK cell may vary depending on a patient's condition and presence or absence of side effects, and thus, administration may be done to a subject in various ways and amounts. Optimal method of administration, dosage, and frequency of administration can be selected by a person skilled in the art within suitable ranges.

The antibody specific CD19 and the NK cell may be administered parenterally, and the administration can be done by any method suitable for intratumoral, intraperitoneal, subcutaneous, intradermal, intranodal, and intravenous routes, and the like. Specifically, the antibody specific for CD19 and the NK cell may be administered intratumorally, intraperitoneally, or intravenously. On the other hand, dosages of the antibody specific for CD19 and the NK cell can be determined depending on schedule of administration, dosage, and a health condition of a patient.

Further, the NK cell may be administered two to five times, and may be administered to a subject at intervals of 1 to 30 days, 2 to 15 days, or 3 to 10 days.

The antibody specific for CD19 may be administered within 2 to 48 hours after administration of the NK cell. Specifically, the antibody specific for CD19 may be administered continuously for 3 to 5 days before administration of the NK cell, and for 9 to 11 days, once a day, starting from 2 hours after administration of the NK cell. Details related to cancer that is a target disease on which synergistic therapeutic effects are exhibited due to the above combined administration are as described in the pharmaceutical combination.

Another aspect of the present invention provides a use of the antibody specific for CD19 used in a pharmaceutical combination with the natural killer cell for preparing a medicament for treatment of cancer.

Since the antibody specific for CD19, the natural killer cell and the combined administration thereof used in the present invention have already been described above, descriptions thereof are omitted in order to avoid excessive redundancy.

Hereinafter, the present invention will be described in more detail by way of the following examples. Here, the present inventors intend to describe synergistic effects of combined administration of the anti-CD19 antibody and the natural killer cell. However, the following examples are given to merely illustrate the present invention, and a scope of the present invention is not limited thereto only.

TABLE 1

| Antibody | | SEQ ID NO: | [aa]/DNA |
|---|---|---|---|
| MOR208 | HCDR1 | SEQ ID NO: 1 | SYVMH |
| | HCDR2 | SEQ ID NO: 2 | NPYNDG |
| | HCDR3 | SEQ ID NO: 3 | GTYYYGTRVFDY |
| | LCDR1 | SEQ ID NO: 4 | RSSKSLQNVNGNTYLY |
| | LCDR2 | SEQ ID NO: 5 | RMSNLNS |
| | LCDR3 | SEQ ID NO: 6 | MQHLEYPIT |
| | VH | SEQ ID NO: 8 | EVQLVESGGGLVKPGGSLKLSCAASGYTFTSYVMHWVRQAPGKGLEWIGYINPYNDGTKYNEKFQGRVTISSDKSISTAYMELSSLRSEDTAMYYCARGTYYYGTRVFDYWGQGTLVTVSS |
| | VL | SEQ ID NO: 9 | DIVMTQSPATLSLSPGERATLSCRSSKSLQNVNGNTYLYWFQQKPGQSPQLLIYRMSNLNSGVPDRFSGSGSGTEFTLTISSLEPEDFAVYYCMQHLEYPITFGAGTKLEIK |
| | Heavy chain constant region | SEQ ID NO: 10 | ASTKGPSVFPLAPSSKSTSGGTAALGCLVKDYFPEPVTVSWNSGALTSGVHTFPAVLQSSGLYSLSSVVTVPSSSLGTQTYICNVNHKPSNTKVDKKVEPKSCDKTHTCPPCPAPELLGGPDVFLFPPKPKDTLMISRTPEVTCVVVDVSHEDPEVQFNWYVDGVEVHNAKTKPREEQFNSTFRVVSVLTVVHQDWLNGKEYKCKVSNKALPAPEEKTISKTKGQPREPQVYTLPPSREEMTKNQVSLTCLVKGFYPSDIAVEWESNGQPENNYKTTPPMLDSDGSFFLYSKLTVDKSRWQQGNVFSCSVMHEALHNHYTQKSLSLSPGK |
| | Light chain constant region | SEQ ID NO: 11 | RTVAAPSVFIFPPSDEQLKSGTASVVCLLNNFYPREAKVQWKVDNALQSGNSQESVTEQDSKDSTYSLSSTLTLSKADYEKHKVYACEVTHQGLSSPVTKSFNRGEC |
| CD19 | Human CD19 | SEQ ID NO: 7 | MPPPRLLFFLLFLTPMEVRPEEPLVVKVEEGDNAVLQCLKGTSDGPTQQLTWSRESPLKPFLKLSLGLPGLGIHMRPLAIWLFIFNVSQQMGGFYLCQPGPPSEKAWQPGWTVNVEGSGELFRWNVSDLGGLGCGLKNRSSEGPSSPSGKLMSPKLYVWAKDRPEIWEGEPPCLPPRDSLNQSLSQDLTMAPGSTLWLSCGVPPDSVSRGPLSWTHVHPKGPKSLLSLELKDDRPARDMWVMETGLLLPRATAQDAGKYYCHRGNLTMSFHLEITARPVLWHWLLRTGGWKVSAVTLAYLIFCLCSLVGILHLQRALVLRRKRKRMTDPTRRFFKVTPPPGSGPQNQYGNVLSLPTPTSGLGRAQRWAAGLGGTAPSYGNPSSDVQADGALGSRSPPGVGPEEEEGEGYEEPDSEEDSEFYENDSNLGQDQLSQDGSGYENPEDEPLGPEDEDSFSNAESYENEDEELTQPVARTMDFLSPHGSAWDPSREATSLGSQSYEDMRGILYAAPQLRSIRGQPGPNHEEDADSYENMDNPDGPDPAWGGGRMGTWSTR |

MODE FOR THE INVENTION

Preparation Example 1. Cell Lines, Primary Cells, and Culture Conditions

Raji and Ramos cell lines (human Burkitt's lymphoma cell lines) were obtained from the American Type Culture Collection (ATCC, USA). Raj and Ramos cell lines were maintained in RPMI 1640 medium supplemented with 10% fetal bovine serum (FBS) and 2 mmol/L of glutamine. Regarding NK cells, peripheral blood mononuclear cells (PBMCs) were isolated randomly from healthy donors, and NK cells were expansion-cultured under good manufacturing practice (GMP) conditions in a manner as described above (MG4101, Green Cross Labcell Corporation). Briefly, PBMCs in which CD3+ T cells were almost completely removed were expansion-cultured in a CellGro SCGM serum-free medium (Cellgenix) containing 1% auto-plasma, $5 \times 10^6$ cells/mL of autologous PBMC irradiated with radiation (2,000 rad), 10 ng/mL of monoclonal antibody for CD3 (OKT3, eBioscience), and 500 IU/mL of IL2 (Proleukin). 500 IU/mL of IL2 was supplied to the medium every 2 to 3 days while the NK cells were cultured.

Preparation Example 2. Monoclonal Antibody

MOR208, which is an antibody specific for CD19, was provided by MorphoSys AG (Germany). Rituximab (anti-CD20 antibody) was purchased from Roche. Antigen expression level determined as MOR208 or rituximab antibodies bound per cell were determined by flow cytometry (Quantibrite kit, BD Biosciences) according to the manufacturer's instructions. The number of MOR208 binding sites per cell of Raji and Ramos are 56,702 and 27,772 respectively. The number of rituximab binding sites per cell of Raji and Ramos are 59,974 and 168,253, respectively.

Preparation Example 3. Calcein-Release Cytotoxicity Assay

Target cells were labeled with 30 uM calcein-acetoxymethyl ester (calcein-AM; Molecular Probes) at 37° C. for 1 hour. After washing, the labeled target cells were dispensed into a 96-well plate at $1\times10^4$ cells per well. A monoclonal antibody (MOR208, rituximab, or control irrelevant antibody) was added to the target cells (at a concentration between 0.001 ng/mL and 10 ug/mL). MG4101 was harvested, washed and added to the target cells in a 3:1 (E/T) ratio. After 2 hours, the plate was spun at 2,000 rpm for 3 minutes, and 100 uL of the supernatant was collected. Then, a fluorescence value (OD480/535 nm) was measured using a fluorescent microplate reader (Victor3, Perkin Elmer), to determine an amount of calcein released. A specific amount of calcein released was calculated using the following equation:

Specific dissolution %=(Test release−Spontaneous release)×100/(Maximum release−Spontaneous release)

The maximum dissolution was achieved with 1% Triton X-100.

Preparation Example 4. Mouse Tumor Model

Preparation Example 4.1. Establishment of Ramos Xenograft Model in SCID Mice Ramos cells ($1\times10^5$, $5\times10^5$, or $10\times10^5$ per mouse) were suspended in PBS and intravenously injected into SCID mice. Animals were monitored daily for signs of disease, hind limb paralysis, or death.

Preparation Example 4.2. MOR208 Dose Test in Ramos Xenograft Model

Ramos cells ($1\times10^6$ per mouse) were suspended in PBS and intravenously injected into SCID mice (day 0). MOR208 was administered by intravenous injection at various concentrations (20, 60, or 200 ug/100 uL/head) on days 3, 6, 10, 13, 17, and 20. Animals were monitored daily for signs of disease, hind limb paralysis, or death.

Preparation Example 4.3. MG4101 Dose Test in Ramos Xenograft Model

Ramos cells ($1\times10^6$ per mouse) were suspended in PBS and intravenously injected into SCID mice (day 0). MG4101 was administered by intravenous injection at various concentrations (1, 2, or $5\times10^7$/400 uL/head) on days 4, 7, 11, 14, 18, and 21. Animals were monitored daily for signs of disease, hind limb paralysis, or death.

Preparation Example 4.4. MG4101+MOR208 Efficacy Test in Ramos Xenograft Model Ramos cells ($1\times10^6$ per mouse) were suspended in PBS and intravenously injected into SCID mice (day 0). Mice were divided into 6 groups and adjusted as follows:
i) Freezing medium and intravenous injection of hIgG (200 ug)
ii) Intravenous injection of MG4101 ($2\times10^7$/400 uL/head)
iii) Intravenous injection of MOR208 (60 ug/head)
iv) Intravenous injection of MOR208 (200 ug/head)
v) Intravenous injection of MG4101 ($2\times10^7$/400 uL/head) and intravenous injection of MOR208 (60 ug/head)
vi) Intravenous injection of MG4101 ($2\times10^7$/400 uL/head) and intravenous injection of MOR208 (200 ug/head).

These administrations were carried out by intravenous injection twice a week for 3 weeks with hIgG or MOR208 at various concentrations (60 or 200 ug/100 uL/head) on days 3, 6, 10, 13, 17, and 20.

Intravenous injection of MG4101 (at a concentration of $2\times10^7$/400 uL/head) was carried out on days 4, 7, 11, 14, 18, and 21. Animals were monitored daily for signs of disease, hind limb paralysis, or death.

Experimental Example 1. Confirmation of Strong in vitro ADCC Activity of MOR208 against Malignant B Cells Because NK cell-mediated ADCC is very important for activity of monoclonal antibodies, the present inventors firstly determined ADCC activity of MOR208 (anti-CD19 antibody) and MG4101 (NK cell) in Raji and Ramos which are Burkitt's lymphoma cell lines, as compared with rituximab which is a standard monoclonal antibody for the treatment of lymphoma, and is used as a positive control and reference value in the present invention.

First, Raji and Ramos cell lines (Burkitt's lymphomas, CD19+CD20+) were cultured for 2 hours with increasing concentrations of MOR208 or rituximab in the presence of activated and expanded liquid-type and frozen-type MG4101 obtained from three healthy donors (E/T ratio: 3:1).

A specific ADCC (%) was calculated by the following equation, and the results are shown in FIG. 1 (in which graphs show average ADCC (%)±SD of 3 experimental values obtained from one NK cell donor representative in two different donors).

(Sample release−Spontaneous release)/(Maximum release−Spontaneous release)×100.

As shown in FIGS. 1a to 1d, MOR208 exhibited remarkable in vitro ADCC activity against Raji and Ramos cell lines. As compared with a hIgG co-treated control, both MOR208 and rituximab showed a dose dependent efficacy against both tumor cell lines with activity already at low antibody concentrations and an increased maximum tumor cell lysis. Taking it into consideration that MOR208 and rituximab showed a comparable maximum killing efficacy as well as substantially higher levels of CD20 compared to CD19 (material and methods), MOR208 has been demonstrated to have an overall lower $EC_{50}$ compared to rituximab on various malignant B cells that include Raji, and Ramos cells. This indicates that MOR208 can be an interesting alternative therapeutic agent under a condition where rituximab exhibits poor effects.

Experimental Example 2. Effects of MOR208 on Lymphoma Cell Death in Xenograft SCID Mice

Experimental Example 2.1. Establishment of Ramos Xenograft Model in SCID Mice Model With respect to MOR208 in vivo experiments, a xenograft SCID mice model was established using Ramos cells to evaluate suitability of Ramos cell lines. Groups of 6 SCID mice were injected i.v. with $1\times10^5$, $5\times10^5$, $10\times10^5$ Ramos cells or PBS and monitored signs of illness daily. All mice died between day 26 and day 37 after injection of Ramos.

Referring to FIG. 2, intravenous injection with various concentrations of Ramos cells showed tumorigenic activity in mice which is characterized by symptoms including progressive weight loss and hind limb paralysis, and nearly 100% mice died between day 26 and day 37 after injection. For follow-up experiments, an optimal dose of the Ramos cell line was selected at 1×10⁶ cells.

Experimental Example 2.2. MOR208 Dose Test in Ramos Xenograft Model

An efficacy of MOR208 on B lymphoma cell death is clinically important for a possibility of depleting primary malignant B cells in patients. The present inventors intravenously injected Ramos cells into SCID mice and evaluated an antitumor activity of MOR208 in a propagated lymphoma model in which MOR208 was administered as described in the "Preparation Examples" above. In this model, disseminated Ramos cells infiltrated all mouse organs including the central nervous system, thus reflecting diseases such as propagated Burkitt's lymphoma and acute lymphoblastic leukemia. In this regard, groups of 10 SCID mice were injected i.v. with 1×10⁶ Ramos cells (day 0). Mice were treated with monoclonal antibodies (20, 60, or 200 mg/100 mL/head) or hIgG (hIgG 200 mg/100 mL/head) as a negative control on days 3, 6, 10, 13, 17, and 20, and observed daily for signs of disease.

As shown in FIG. 3, treatment with 200 mg of MOR208 significantly prolonged survival of mice (P<0.001) as compared with animals treated with the control monoclonal antibody. A median survival time in mice treated with 200 mg of MOR208, which was 36 days, was found to be longer than that in mice treated with control antibody, which was 28.5 days.

Experimental Example 2.3. MG4101 Dose Test in Ramos Xenograft Model

SCID mice injected with Ramos cells were intravenously injected with in vitro expanded and activated MG4101 cells of healthy donors as described in the "Preparation Examples". This MG4101 cell supplement is intended to mimic presence of tissue NK cells which may be present in a patient's organ. Specifically, groups of 10 SCID mice were injected i.v. with 1×10⁶ Ramos cells (day 0). Mice were administered with MG4101 (1, 2, or 5×10⁷/400 mL/head) or as a control with the NK cell freezing medium alone on days 4, 7, 11, 14, 18, and 21, and observed daily for signs of disease.

As shown in FIG. 4, a survival rate of mice to which MG4101 was administered at a dosage of 5×10⁷ cells per mouse was significantly enhanced (P<0.05), as compared with mice treated with the control (freezing medium). The median survival time of mice treated with 5×10⁷ cells of MG4101 was 33 days, and that of mice treated with the freezing medium control was 28 days.

Experimental Example 2.4. Confirmation of Effects Due to Combined Administration of MG4101+MOR208 in Ramos Xenograft Model Mice injected with Ramos cells were randomly divided into several groups, and treated with two dosages of MOR208 or MG4101 alone, two dosages of a combination of MOR208 and MG4101, or NK cell freezing medium containing hIgG as a control on day 3 after inoculation of Ramos cells as described in the "Preparation Examples". Specifically, groups of 10 SCID mice were injected i.v. with 1×10⁶ Ramos cells (day 0). Mice were treated with monoclonal antibodies (60 or 200 mg/100 mL/head) on days 3, 6, 10, 13, 17, and 20. Mice were intravenously injected with MG4101 (at a concentration of 2×10⁷/400 mL/head) on days 4, 7, 11, 14, 18, and 21, and monitored daily.

As shown in FIG. 5, it was confirmed that the mice treated with MOR208 exhibited significantly enhanced protective effects as compared with the injected control hIgG in freezing medium. MG4101-injected groups exhibited significant improvement as compared to the control. The median survival time was increased to 45.5 and 38 days for the 200 mg of MOR208-treated mice (P<0.0001) and the 2×10⁷ cells of MG4101-treated mice (P<0.001) respectively compared with 30.5 days for the control freezing medium-treated ones.

On the other hand, animals treated with the combination of MOR208 and MG4101 exhibited a synergistic increase in survival during the experiment period. Specifically, the median survival time was increased to 52 and 62 days for the 60 mg and 200 mg of MOR208-treated mice respectively on the back ground of the 2×10⁷ cells of MG4101 co-injection (P<0.0001). Considerable synergistic effects of the combined administration of MOR208 and MG4101 were also exhibited in an analysis for increased survival. In particular, each increase in the mean survival rate due to individual treatment with MOR208 or MG4101 was 11.5% (60 mg of MOR208), 49.2% (200 mg of MOR208), and 24.6% (2×10⁷ cells of MG4101), respectively. In contrast, simultaneous treatment of MOR208 and MG4101 showed effects of increased survival rate of 70.5% (60 mg of MOR208) and 103.3% (200 mg of MOR208), respectively, in a situation where MG4101 was simultaneously injected. These results confirm that, as compared with animals injected separately with MOR208 or MG4101, the simultaneous treatment (combination) of MG4101 and MOR208 significantly prolonged survival of mice, in particular, by a factor of 2 in a case where 60 mg of MOR208 was simultaneously injected.

In other words, both the in vitro and in vivo data identified in the present invention suggest possibilities that a combination of an anti-CD19 antibody and a natural killer cell, that is, combination therapy of the two components, can be an effective therapeutic agent for human B lymphoma, leukemia, and the like, and also exhibit remarkable therapeutic effects on various B cell malignant tumors.

The invention claimed is:

1. A method for treatment of a cancer in a human subject in need thereof, comprising administering to the human subject an antibody specific for CD19 and an NK cell, wherein the antibody comprises a heavy chain variable region comprising an HCDR1 region of SYVMH (SEQ ID NO:1), an HCDR2 region of NPYNDG (SEQ ID NO:2), and an HCDR3 region of GTYYYGTRVFDY (SEQ ID NO:3), and wherein the antibody comprises a light chain variable region comprising an LCDR1 region of RSSKSLQNVNG-NTYLY (SEQ ID NO: 4), an LCDR2 region of RMSNLNS (SEQ ID NO:5), and an LCDR3 region of MQHLEYPIT (SEQ ID NO:6).

2. The method according to claim 1, wherein the NK cell is prepared by the following steps (i) to (iii):
step (i) of performing a stationary culture of isolated NK cells in a culture medium containing anti-CD3 antibodies, cytokines, and feeder cells to stimulate intercellular contacts;
step (ii) of adding cytokines, anti-CD3 antibodies, and feeder cells thereto for re-stimulation and performing a stationary culture again to induce intracellular contacts; and
step (iii) of adding a medium containing cytokines to the cells and performing a stationary or suspension culture while constantly maintaining a concentration of the cells and a concentration of the cytokines.

3. The method according to claim 1, wherein the NK cell is prepared by a method comprising co-culturing feeder cells and seed cells, wherein the feeder cells are CD4 (+) T cells selected from the group consisting of CD4 (+) T cells that have been isolated ex vivo, CD4 (+) T cells that have been expansion-cultured ex vivo, and CD4 (+) T cell lines.

4. The method according to claim 3, wherein the CD4 (+) T cell lines are CD4 (+)/CD1 (−) T cell lines.

5. The method according to claim 4, wherein the CD4 (+)/CD1 (−) T cell lines are H9 or HuT78 cell lines.

6. The method according to claim 3, wherein the seed cells are one or more selected from the group consisting of peripheral blood-derived cells, peripheral blood leukocyte cells, peripheral blood mononuclear cells (PBMCs), umbilical cord blood leukocyte cells, umbilical cord blood mononuclear cells, natural killer cells derived from stem cells, enriched natural killer cells, and isolated natural killer cells.

7. The method according to claim 1, wherein the cancer is at least one selected from the group consisting of gastric cancer, liver cancer, lung cancer, colorectal cancer, breast cancer, prostate cancer, ovarian cancer, pancreatic cancer, cervical cancer, thyroid cancer, laryngeal cancer, acute lymphocytic leukemia, brain tumor, neuroblastoma, retinoblastoma, head and neck cancer, salivary gland cancer, lymphoma, and a malignant tumor of B cell origin.

8. The method according to claim 1, wherein the antibody specific for CD19 and the NK cell are administered in a simultaneous manner.

9. The method according to claim 1, wherein the antibody specific for CD19 and the NK cell are administered in a separate manner.

10. The method according to claim 1, wherein the heavy chain variable region comprises the sequence EVOLVES- GGGLVKPGGSLKLSCAASGYTFT-SYVMHWVRQAPGKGLEWIGYINPYNDGTKYNEKFQGRVTISSDKSISTAYMELSSLRSEDTAMYYCARGTYYYGTRVFDYWGQGTL VTVSS (SEQ ID NO:8) and the light chain variable region comprises the sequence DIVMTQSPATLSLSPGER-ATLSCRSSKSLQNVNGNTY-LYWFQQKPGQSPQLLIYRMSNLNSGVPDRFSGSGSGTEFTLTISSLEPEDFAVYYCMQH-LEYPITFGAGTKLEIK (SEQ ID NO: 9).

11. The method according to claim 1, wherein the antibody comprises a heavy chain constant region of ASTKGPSVFPLAPSSKSTSGGTAALGCLVKDYF-PEPVTVSWNSGALTSGVHTFPAVLQSS GLYS-LSSVVTVPSSSLGTQTYICNVNHKPSNTKVDKKVE-PKSCDKTHTCPPCPAPELLGGPDVFLFPPKPKDTLMISRTPEVTCVVVDVSHEDPE-VQFNWYVDGVEVHNAKTKPREEQFNSTFRVVSVLTVVHQDWLNGKEYKCKVSNKALPAP-EEKTISKTKGQPREPQVYTLPPSR EEMTKNQVSLT-CLVKGFYPSDIAVEWESNGQPEN-NYKTTPPMLDSDGSFFLYSKLTVDKSRWQQGNVFSCSVMHEALHNHYTQKSLSLSPGK (SEQ ID NO:10).

12. The method according to claim 1, wherein the antibody comprises a light chain constant region of RTVAAPSVFIFPPSDEQLKSGTASVVCLLNNFY-PREAKVQWKVDNALQSGNSQESVTEQ DSKDSTYS-LSSTLTLSKADYEKHKVYACE-VTHQGLSSPVTKSFNRGEC (SEQ ID NO:11).

13. The method according to claim 1, wherein the antibody comprises a heavy chain constant region of ASTKGPSVFPLAPSSKSTSGGTAALGCLVKDYF-PEPVTVSWNSGALTSGVHTFPAVLQSS GLYS-LSSVVTVPSSSLGTQTYICNVNHKPSNTKVDKKVE-PKSCDKTHTCPPCPAPELLGGPDVFLFPPKPKDTLMISRTPEVTCVVVDVSHEDPE-VQFNWYVDGVEVHNAKTKPREEQFNSTFRVVSVLTVVHQDWLNGKEYKCKVSNKALPAP-EEKTISKTKGQPREPQVYTLPPSR EEMTKNQVSLT-CLVKGFYPSDIA VEWESNGQPEN-NYKTTPPMLDSDGSFFLYSKLTVDKSRWQQGNVFSCSVMHEALHNHYTQKSLSLSPGK (SEQ ID NO:10) and a light chain constant region of RTVAAPSVFIFPPSDEQLKSGTASVVCLLNNFY-PREAKVQWKVDNALQSGNSQESVTEQ DSKDSTYS-LSSTLTLSKADYEKHKVYACE-VTHQGLSSPVTKSFNRGEC (SEQ ID NO:11).

14. The method according to claim 10, wherein the antibody comprises a heavy chain constant region of ASTKGPSVFPLAPSSKSTSGGTAALGCLVKDYF-PEPVTVSWNSGALTSGVHTFPAVLQSS GLYS-LSSVVTVPSSSLGTQTYICNVNHKPSNTKVDKKVE-PKSCDKTHTCPPCPAPELLGGPDVFLFPPKPKDTLMISRTPEVTCVVVDVSHEDPE-VQFNWYVDGVEVHNAKTKPREEQFNSTFRVVSVLTVVHQDWLNGKEYKCKVSNKALPAP-EEKTISKTKGQPREPQVYTLPPSR EEMTKNQVSLT-CLVKGFYPSDIA VEWESNGQPEN-NYKTTPPMLDSDGSFFLYSKLTVDKSRWQQGNVFSCSVMHEALHNHYTQKSLSLSPGK (SEQ ID NO:10) and a light chain constant region of RTVAAPSVFIFPPSDEQLKSGTASVVCLLNNFY-PREAKVQWKVDNALQSGNSQESVTEQ DSKDSTYS-LSSTLTLSKADYEKHKVYACE-VTHQGLSSPVTKSFNRGEC (SEQ ID NO:11).

15. The method according to claim 1, wherein the cancer is a non-Hodgkin's lymphoma, chronic lymphocytic leukemia, or acute lymphoblastic leukemia.

16. The method according to claim 15, wherein the cancer is a non-Hodgkin's lymphoma.

17. The method according to claim 16, wherein the non-Hodgkin's lymphoma is follicular lymphoma, small lymphocytic lymphoma, mucosa-associated lymphoid tissue lymphoma, marginal zone lymphoma, diffuse large B-cell lymphoma, Burkitt's lymphoma, or mantle cell lymphoma.

18. The method according to claim 10, wherein the cancer is a non-Hodgkin's lymphoma, chronic lymphocytic leukemia, or acute lymphoblastic leukemia.

19. The method according to claim 18, wherein the cancer is a non-Hodgkin's lymphoma.

20. The method according to claim 19, wherein the non-Hodgkin's lymphoma is follicular lymphoma, small lymphocytic lymphoma, mucosa-associated lymphoid tissue lymphoma, marginal zone lymphoma, diffuse large B-cell lymphoma, Burkitt's lymphoma, or mantle cell lymphoma.

21. The method according to claim 14, wherein the cancer is a non-Hodgkin's lymphoma, chronic lymphocytic leukemia, or acute lymphoblastic leukemia.

22. The method according to claim 21, wherein the cancer is a non-Hodgkin's lymphoma.

23. The method according to claim 22, wherein the non-Hodgkin's lymphoma is follicular lymphoma, small lymphocytic lymphoma, mucosa-associated lymphoid tissue lymphoma, marginal zone lymphoma, diffuse large B-cell lymphoma, Burkitt's lymphoma, or mantle cell lymphoma.

* * * * *

UNITED STATES PATENT AND TRADEMARK OFFICE
CERTIFICATE OF CORRECTION

PATENT NO. : 12,491,244 B2
APPLICATION NO. : 17/275292
DATED : December 9, 2025
INVENTOR(S) : Jung Hyun Her et al.

Page 1 of 1

It is certified that error appears in the above-identified patent and that said Letters Patent is hereby corrected as shown below:

In the Claims

Column 28, Line 67, Claim 10, delete "EVOLVES-" and insert -- EVQLVES- --.

Signed and Sealed this
Third Day of February, 2026

John A. Squires
*Director of the United States Patent and Trademark Office*

SEQUENCE LISTING

<160> NUMBER OF SEQ ID NOS: 11

<210> SEQ ID NO 1
<211> LENGTH: 5
<212> TYPE: PRT
<213> ORGANISM: Artificial Sequence
<220> FEATURE:
<223> OTHER INFORMATION: Synthetic

```
<400> SEQUENCE: 1

Ser Tyr Val Met His
1               5

<210> SEQ ID NO 2
<211> LENGTH: 6
<212> TYPE: PRT
<213> ORGANISM: Artificial Sequence
<220> FEATURE:
<223> OTHER INFORMATION: Synthetic

<400> SEQUENCE: 2

Asn Pro Tyr Asn Asp Gly
1               5

<210> SEQ ID NO 3
<211> LENGTH: 12
<212> TYPE: PRT
<213> ORGANISM: Artificial Sequence
<220> FEATURE:
<223> OTHER INFORMATION: Synthetic

<400> SEQUENCE: 3

Gly Thr Tyr Tyr Tyr Gly Thr Arg Val Phe Asp Tyr
1               5                   10

<210> SEQ ID NO 4
<211> LENGTH: 16
<212> TYPE: PRT
<213> ORGANISM: Artificial Sequence
<220> FEATURE:
<223> OTHER INFORMATION: Synthetic

<400> SEQUENCE: 4

Arg Ser Ser Lys Ser Leu Gln Asn Val Asn Gly Asn Thr Tyr Leu Tyr
1               5                   10                  15

<210> SEQ ID NO 5
<211> LENGTH: 7
<212> TYPE: PRT
<213> ORGANISM: Artificial Sequence
<220> FEATURE:
<223> OTHER INFORMATION: Synthetic

<400> SEQUENCE: 5

Arg Met Ser Asn Leu Asn Ser
1               5

<210> SEQ ID NO 6
<211> LENGTH: 9
<212> TYPE: PRT
<213> ORGANISM: Artificial Sequence
<220> FEATURE:
<223> OTHER INFORMATION: Synthetic

<400> SEQUENCE: 6

Met Gln His Leu Glu Tyr Pro Ile Thr
1               5

<210> SEQ ID NO 7
<211> LENGTH: 556
<212> TYPE: PRT
<213> ORGANISM: Artificial Sequence
<220> FEATURE:
<223> OTHER INFORMATION: Synthetic

<400> SEQUENCE: 7
```

-continued

```
Met Pro Pro Pro Arg Leu Leu Phe Phe Leu Leu Phe Leu Thr Pro Met
1               5                   10                  15

Glu Val Arg Pro Glu Glu Pro Leu Val Val Lys Val Glu Glu Gly Asp
            20                  25                  30

Asn Ala Val Leu Gln Cys Leu Lys Gly Thr Ser Asp Gly Pro Thr Gln
        35                  40                  45

Gln Leu Thr Trp Ser Arg Glu Ser Pro Leu Lys Pro Phe Leu Lys Leu
50                  55                  60

Ser Leu Gly Leu Pro Gly Leu Gly Ile His Met Arg Pro Leu Ala Ile
65                  70                  75                  80

Trp Leu Phe Ile Phe Asn Val Ser Gln Gln Met Gly Gly Phe Tyr Leu
                85                  90                  95

Cys Gln Pro Gly Pro Pro Ser Glu Lys Ala Trp Gln Pro Gly Trp Thr
                100                 105                 110

Val Asn Val Glu Gly Ser Gly Glu Leu Phe Arg Trp Asn Val Ser Asp
            115                 120                 125

Leu Gly Gly Leu Gly Cys Gly Leu Lys Asn Arg Ser Ser Glu Gly Pro
    130                 135                 140

Ser Ser Pro Ser Gly Lys Leu Met Ser Pro Lys Leu Tyr Val Trp Ala
145                 150                 155                 160

Lys Asp Arg Pro Glu Ile Trp Glu Gly Glu Pro Pro Cys Leu Pro Pro
                165                 170                 175

Arg Asp Ser Leu Asn Gln Ser Leu Ser Gln Asp Leu Thr Met Ala Pro
                180                 185                 190

Gly Ser Thr Leu Trp Leu Ser Cys Gly Val Pro Pro Asp Ser Val Ser
                195                 200                 205

Arg Gly Pro Leu Ser Trp Thr His Val His Pro Lys Gly Pro Lys Ser
            210                 215                 220

Leu Leu Ser Leu Glu Leu Lys Asp Asp Arg Pro Ala Arg Asp Met Trp
225                 230                 235                 240

Val Met Glu Thr Gly Leu Leu Leu Pro Arg Ala Thr Ala Gln Asp Ala
                245                 250                 255

Gly Lys Tyr Tyr Cys His Arg Gly Asn Leu Thr Met Ser Phe His Leu
                260                 265                 270

Glu Ile Thr Ala Arg Pro Val Leu Trp His Trp Leu Leu Arg Thr Gly
                275                 280                 285

Gly Trp Lys Val Ser Ala Val Thr Leu Ala Tyr Leu Ile Phe Cys Leu
            290                 295                 300

Cys Ser Leu Val Gly Ile Leu His Leu Gln Arg Ala Leu Val Leu Arg
305                 310                 315                 320

Arg Lys Arg Lys Arg Met Thr Asp Pro Thr Arg Arg Phe Phe Lys Val
                325                 330                 335

Thr Pro Pro Pro Gly Ser Gly Pro Gln Asn Gln Tyr Gly Asn Val Leu
                340                 345                 350

Ser Leu Pro Thr Pro Thr Ser Gly Leu Gly Arg Ala Gln Arg Trp Ala
            355                 360                 365

Ala Gly Leu Gly Gly Thr Ala Pro Ser Tyr Gly Asn Pro Ser Ser Asp
    370                 375                 380

Val Gln Ala Asp Gly Ala Leu Gly Ser Arg Ser Pro Pro Gly Val Gly
385                 390                 395                 400

Pro Glu Glu Glu Glu Gly Glu Gly Tyr Glu Glu Pro Asp Ser Glu Glu
                405                 410                 415
```

Asp Ser Glu Phe Tyr Glu Asn Asp Ser Asn Leu Gly Gln Asp Gln Leu
                420                 425                 430

Ser Gln Asp Gly Ser Gly Tyr Glu Asn Pro Glu Asp Glu Pro Leu Gly
        435                 440                 445

Pro Glu Asp Glu Asp Ser Phe Ser Asn Ala Glu Ser Tyr Glu Asn Glu
450                 455                 460

Asp Glu Glu Leu Thr Gln Pro Val Ala Arg Thr Met Asp Phe Leu Ser
465                 470                 475                 480

Pro His Gly Ser Ala Trp Asp Pro Ser Arg Glu Ala Thr Ser Leu Gly
                485                 490                 495

Ser Gln Ser Tyr Glu Asp Met Arg Gly Ile Leu Tyr Ala Ala Pro Gln
        500                 505                 510

Leu Arg Ser Ile Arg Gly Gln Pro Gly Pro Asn His Glu Glu Asp Ala
            515                 520                 525

Asp Ser Tyr Glu Asn Met Asp Asn Pro Asp Gly Pro Asp Pro Ala Trp
530                 535                 540

Gly Gly Gly Gly Arg Met Gly Thr Trp Ser Thr Arg
545                 550                 555

<210> SEQ ID NO 8
<211> LENGTH: 121
<212> TYPE: PRT
<213> ORGANISM: Artificial Sequence
<220> FEATURE:
<223> OTHER INFORMATION: Synthetic

<400> SEQUENCE: 8

Glu Val Gln Leu Val Glu Ser Gly Gly Gly Leu Val Lys Pro Gly Gly
1               5                   10                  15

Ser Leu Lys Leu Ser Cys Ala Ala Ser Gly Tyr Thr Phe Thr Ser Tyr
            20                  25                  30

Val Met His Trp Val Arg Gln Ala Pro Gly Lys Gly Leu Glu Trp Ile
        35                  40                  45

Gly Tyr Ile Asn Pro Tyr Asn Asp Gly Thr Lys Tyr Asn Glu Lys Phe
    50                  55                  60

Gln Gly Arg Val Thr Ile Ser Ser Asp Lys Ser Ile Ser Thr Ala Tyr
65                  70                  75                  80

Met Glu Leu Ser Ser Leu Arg Ser Glu Asp Thr Ala Met Tyr Tyr Cys
                85                  90                  95

Ala Arg Gly Thr Tyr Tyr Tyr Gly Thr Arg Val Phe Asp Tyr Trp Gly
            100                 105                 110

Gln Gly Thr Leu Val Thr Val Ser Ser
        115                 120

<210> SEQ ID NO 9
<211> LENGTH: 112
<212> TYPE: PRT
<213> ORGANISM: Artificial Sequence
<220> FEATURE:
<223> OTHER INFORMATION: Synthetic

<400> SEQUENCE: 9

Asp Ile Val Met Thr Gln Ser Pro Ala Thr Leu Ser Leu Ser Pro Gly
1               5                   10                  15

Glu Arg Ala Thr Leu Ser Cys Arg Ser Ser Lys Ser Leu Gln Asn Val
            20                  25                  30

Asn Gly Asn Thr Tyr Leu Tyr Trp Phe Gln Gln Lys Pro Gly Gln Ser
        35                  40                  45

```
Pro Gln Leu Leu Ile Tyr Arg Met Ser Asn Leu Asn Ser Gly Val Pro
         50                  55                  60

Asp Arg Phe Ser Gly Ser Gly Ser Gly Thr Glu Phe Thr Leu Thr Ile
 65                  70                  75                  80

Ser Ser Leu Glu Pro Glu Asp Phe Ala Val Tyr Tyr Cys Met Gln His
                 85                  90                  95

Leu Glu Tyr Pro Ile Thr Phe Gly Ala Gly Thr Lys Leu Glu Ile Lys
                100                 105                 110
```

<210> SEQ ID NO 10
<211> LENGTH: 329
<212> TYPE: PRT
<213> ORGANISM: Artificial Sequence
<220> FEATURE:
<223> OTHER INFORMATION: Synthetic

<400> SEQUENCE: 10

```
Ala Ser Thr Lys Gly Pro Ser Val Phe Pro Leu Ala Pro Ser Ser Lys
  1               5                  10                  15

Ser Thr Ser Gly Gly Thr Ala Ala Leu Gly Cys Leu Val Lys Asp Tyr
                 20                  25                  30

Phe Pro Glu Pro Val Thr Val Ser Trp Asn Ser Gly Ala Leu Thr Ser
             35                  40                  45

Gly Val His Thr Phe Pro Ala Val Leu Gln Ser Ser Gly Leu Tyr Ser
         50                  55                  60

Leu Ser Ser Trp Thr Val Pro Ser Ser Ser Leu Gly Thr Gln Thr Tyr
 65                  70                  75                  80

Ile Cys Asn Val Asn His Lys Pro Ser Asn Thr Lys Val Asp Lys Lys
                 85                  90                  95

Val Glu Pro Lys Ser Cys Asp Lys Thr His Thr Cys Pro Pro Cys Pro
                100                 105                 110

Ala Pro Glu Leu Leu Gly Gly Pro Asp Val Phe Leu Phe Pro Pro Lys
            115                 120                 125

Pro Lys Asp Thr Leu Met Ile Ser Arg Thr Pro Glu Val Thr Cys Val
130                 135                 140

Val Val Asp Val Ser His Glu Asp Pro Glu Val Gln Phe Asn Trp Tyr
145                 150                 155                 160

Val Asp Gly Val Glu Val His Asn Ala Lys Thr Lys Pro Arg Glu Glu
                165                 170                 175

Gln Phe Asn Ser Thr Phe Arg Val Val Ser Val Leu Thr Val Val His
            180                 185                 190

Gln Asp Trp Leu Asn Gly Lys Glu Tyr Lys Cys Lys Val Ser Asn Lys
        195                 200                 205

Ala Leu Pro Ala Pro Glu Glu Lys Thr Ile Ser Lys Thr Lys Gly Gln
        210                 215                 220

Pro Arg Glu Pro Gln Val Tyr Thr Leu Pro Pro Ser Arg Glu Glu Met
225                 230                 235                 240

Thr Lys Asn Gln Val Ser Leu Thr Cys Leu Val Lys Gly Phe Tyr Pro
                245                 250                 255

Ser Asp Ile Ala Val Glu Trp Glu Ser Asn Gly Gln Pro Glu Asn Asn
            260                 265                 270

Tyr Lys Thr Thr Pro Pro Met Leu Asp Ser Asp Gly Ser Phe Phe Leu
        275                 280                 285

Tyr Ser Lys Leu Thr Val Asp Lys Ser Arg Trp Gln Gln Gly Asn Val
        290                 295                 300
```

```
Phe Ser Cys Ser Val Met His Glu Ala Leu His Asn His Tyr Thr Gln
305                 310                 315                 320

Lys Ser Leu Ser Leu Ser Pro Gly Lys
                325

<210> SEQ ID NO 11
<211> LENGTH: 107
<212> TYPE: PRT
<213> ORGANISM: Artificial Sequence
<220> FEATURE:
<223> OTHER INFORMATION: Synthetic

<400> SEQUENCE: 11

Arg Thr Val Ala Ala Pro Ser Val Phe Ile Phe Pro Pro Ser Asp Glu
1               5                   10                  15

Gln Leu Lys Ser Gly Thr Ala Ser Val Val Cys Leu Leu Asn Asn Phe
                20                  25                  30

Tyr Pro Arg Glu Ala Lys Val Gln Trp Lys Val Asp Asn Ala Leu Gln
            35                  40                  45

Ser Gly Asn Ser Gln Glu Ser Val Thr Glu Gln Asp Ser Lys Asp Ser
        50                  55                  60

Thr Tyr Ser Leu Ser Ser Thr Leu Thr Leu Ser Lys Ala Asp Tyr Glu
65                  70                  75                  80

Lys His Lys Val Tyr Ala Cys Glu Val Thr His Gln Gly Leu Ser Ser
                85                  90                  95

Pro Val Thr Lys Ser Phe Asn Arg Gly Glu Cys
                100                 105
```